Nov. 3, 1925.
W. C. BUTEHORN
PHOTOGRAPHIC APPARATUS
Original Filed July 21, 1921  2 Sheets-Sheet 1
1,559,936
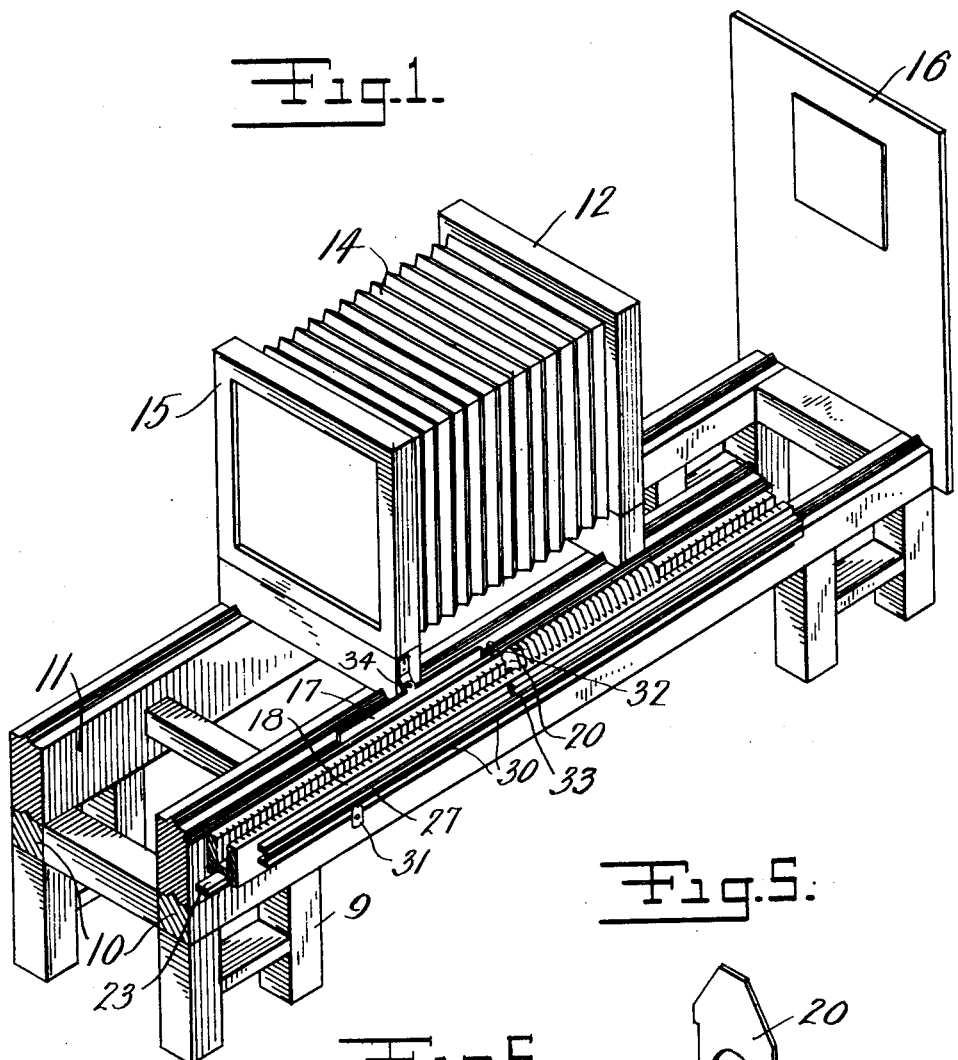
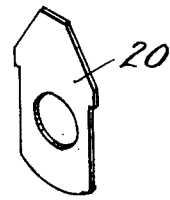
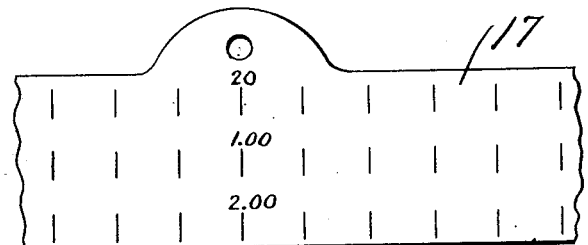

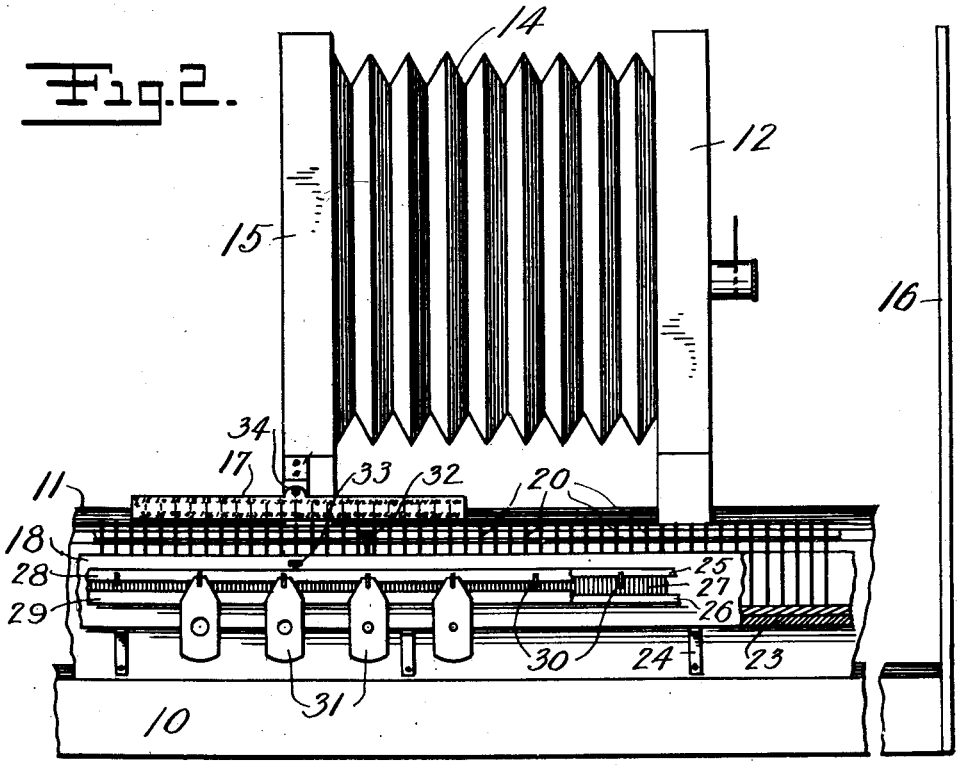
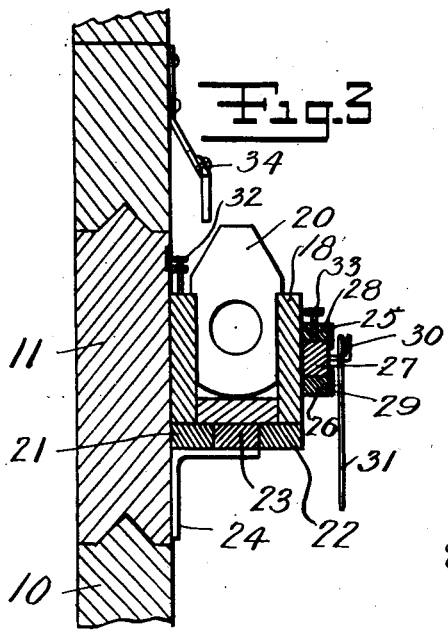
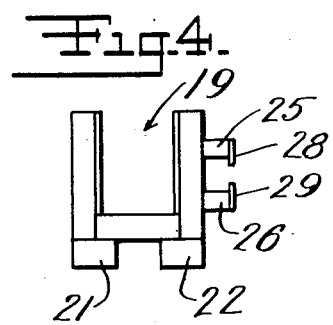

Patented Nov. 3, 1925.

1,559,936

UNITED STATES PATENT OFFICE.

WILLIAM C. BUTEHORN, OF NEW BRIGHTON, NEW YORK.

PHOTOGRAPHIC APPARATUS.

Application filed July 21, 1921, Serial No. 486,643. Renewed April 2, 1925.

*To all whom it may concern:*

Be it known that I, WILLIAM C. BUTE-HORN, a citizen of the United States, residing at New Brighton, Staten Island, in the county of Richmond and State of New York, have invented certain new and useful Improvements in Photographic Apparatus, of which the following is a specification.

This invention relates to photographic apparatus such as is employed in the production of half-tones (photo-engravings) and involving the use of a line screen in the camera.

It is well known that, in changing the position and adjustment of the camera, in making the various reductions or enlargements, the lens opening (aperture in stop) must be changed accordingly as the camera extension changes, it being understood in this method that the given screen distance and predetermined basic time remain unchanged.

An object of my invention is to provide, in connection with, and as part of the ordinary camera equipment, a series of stops with graduated apertures positioned in definite relation to each other by means of a rack, attached to the camera carrier, and slotted to hold the stops in an upright position with edge toward camera.

In addition to this, an indicator will be attached to the extensible plate holder part of the camera. This indicator consists preferably of a strip of metal, running parallel to the stop rack and close to the upper edge of the stops, the length of which will be sufficient to span a predetermined number of stops, the indicia consisting of an equal number of short vertical marks on the lower edge at an equal distance apart to the slots in the rack, and over each mark, vertically alined, the time to make an exposure which will give the desired high-light formation of screen in the negative, is stamped, the time increasing where the indicator points out the smaller stops and decreasing on the larger ones. Thus exposures of various lengths of time can be made each of which will have equal high-light value, but the intermediate tones will vary in intensity according to the length of exposure, the longer exposures giving more detail and the shorter less.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as part of this specification, and in which I have shown merely a preferred form of embodiment of invention;

Figure 1 is a perspective view illustrating a familiar form of camera embodying my invention;

Figure 2 is a side view of the parts shown in Figure 1;

Figure 3 is a sectional view showing the stop rack and part of the camera;

Figure 4 shows an end view of the stop rack;

Figure 5 is a perspective view of one of the stops;

Figure 6 shows a modified form of scale.

Referring to the numerals on the drawings (Figure 1) there is shown at 9 a bed or support provided with tracks 10 on which is slidable a camera carrier 11 having secured thereon a camera, comprising a lens part 12, a bellows part 14, and a plate carrier part 15, the lens part 12 having a stationary relation on the camera carrier 11, and the plate carrier part 15 being movable towards and away from the lens part 12 by the contraction and expansion of the bellows 14.

In use, the camera carrier 11 is moved to the desired position on tracks 10 so that the lens part 12 of the camera is at the proper distance from the "copy" (the picture that is being reproduced) which is held in position on the copy board 16. The distance of the lens part 12 from the copy board 16 varies accordingly as the copy is to be reproduced for enlargement or reduction. The plate holder part 15 is moved towards or away from the lens plate 12 for focusing. At the side of the plate holder part 15 there is an indicator 17, and extending along the side of the camera carrier 11 is a rack 18 provided with numerous slots 19 adapted to receive stop members 20. If, in the adjustment of the camera, the indicator 17 is positioned somewhere else along the length of the rack 18 it will point out some other stop members 20, it being understood that the slots 19 of the rack carry a full series of stops from one end of the rack to the other, the stops at the extreme right hand end having the smallest openings and the ones at the left hand end being the largest in size, and the intermediate ones graduated from right to left between these two extremes.

The rack 18 is shown attached so as to allow it to slide forward or backward along camera carrier 11, thus bringing other stops under the indicator than those ordinarily used. This is done in cases where a very coarse or fine screen is used and also to enable the photographer who wishes to work with larger or smaller stops than those used in the usual adjustment of the rack.

In Figures 3 and 4, 21 and 22 are strips of wood attached to the bottom of the rack 18, one on the outside edge and the other on the inside edge and running along the entire length of the rack 18 forming a groove between both strips. A third strip 23 attached to a bracket 24 (which is also attached to the camera carrier 11) fills out this groove also running the entire length of the groove thereby allowing the rack 18 to slide forward or backward.

At the side of the rack 18 is another sliding device constructed by attaching two strips 25 and 26 to the side of the rack 18 running the entire length thereof and a sufficient distance apart to allow a third strip, 27, which also runs the entire length of the rack, to be inserted in the groove formed by strips 25 and 26. Two strips of metal 28 and 29 attached to strips 25 and 26, hold the center strip 27 in the groove and are of such width as to allow a small section of the center strip 27 to be exposed between flanges 28 and 29. In this exposed part of strip 27 are placed at appropriate intervals along the entire length of same a line of hooks 30 on which will be hung the smaller of the stop members 20 to be used for "flashing" which term is explained in another part of this specification.

The object of this sliding device is to enable the adjustment of the flashing stops 31 in any position backward or forward to correspond with any adjustment of the stop rack 18. A thumb screw 32 holds the stop rack 18 in any desired position, and another thumb screw 33 holds the flash stop strip 27 in the same manner.

The result desired in making a reproduction is determined by the operator, and by using his judgment from his experience he can very readily determine the stop which will give the desired tones throughout the negative.

In stating that the stop when used in conjunction with the time stamped on the indicator, vertically alined with it will give the same high light formation on negatives of any reduction or enlargement, it is understood that a copy with ordinary good whites is used; copies with more or less than ordinary whites will require more or less time, than shown on the indicator over the stop used, accordingly as they vary.

In adjusting the stop rack and indicator it is so done that the stop vertically alined below the mark in the center of the indicator where the attaching screw is, using the time stamped at that point, will be of the proper sized aperture which will give a proper negative from a copy having ordinary whites, good blacks and details of normal photographic values (normal copy).

This is best done by adjusting the stop rack after focusing the camera at a given point, say the same size point where there is no reduction or enlargement, so that a stop which is known to be of the proper size for that position of the camera, comes directly under the center of the indicator. The correct time is then determined by trial exposures and the time thus found to give the desired result will be the basic or normal time and an indicator with that time will be attached.

For copies, whose details only are weak, a stop whose relative time is greater is used, thereby strengthening the details accordingly as the time is lengthened. For copies having details which are undesired, such as a grayish cast over the blacks, smudgy, uneven blacks, or whose details in the white parts are faint, a stop whose relative time is shorter than the normal time is used, the undesired details diminishing accordingly as the time is lessened, also accentuating the details in the white parts.

For copies whose whites are of slower photographic speed than an ordinary white, such as yellowish whites, sepia-toned whites, etc., extra time is added to the time stamped over the stop used according to the operator's judgment, the operator using care to select a stop whose aggregate time (time stamped over stop and extra) is of proper amount to give desired detail. Thus:—

If a copy should be judged to require double the time with the center or normal stops which for example reads two minutes thereby making the aggregate time four minutes, but whose details would be accentuated too greatly in four minutes, a stop having a time of, for example, one minute is used which, when doubled will aggregate two minutes. The operator has then doubled the high light exposure without accentuating the intermediate tones too greatly.

For copies whose whites are greater than the ordinary white, such as Chinese white and other brilliant surfaces, time is subtracted from the time stamped over a selected stop, the operator taking care that the remaining amount of time is sufficient to bring out the intermediate tones. Thus:—

If a copy should be judged to require one-quarter less time on account of brilliant whites, the normal time being two minutes, and the remaining one and one-half minutes being judged as insufficient to bring out the details, a stop having a time of two minutes and forty seconds is used which when reduced by one-quarter will still have two minutes remaining, which time is sufficient to bring out the details. The operator has then reduced the high light exposure, at the same time bringing out the intermediate tones.

In addition to the series of time values stamped over each mark, two more series will be stamped over and vertically alined with the first, the one next above being half the amount of the first, and the third series being one-third the amount of the first series. The object of this is to enable the use of two or three stops in conjunction with each other by exposing part of the one stop time on each. Thus:—

In using one stop the operator reads the lower line of figures on the indicator only and exposes with that time for complete exposure. In using two stops he reads the second line of figures only and uses two stops and exposes with each one for length of time stamped over each. For using three stops he reads the third line only, exposing on each one the amount given. In exposing with plural stops he exposes part of the full time on each, the combined exposures having the same effect on the high light formation in the negative as the single stop exposure, the same rule relating to amount of detail in making one stop exposures applying to the plural stop exposures.

By noting the time of an exposure, duplicate exposures of any reduction or enlargement can be made from the same copy or copies of equal photographic values; and by using good judgment, copies of various qualities can be photographed with reasonable accuracy and all negatives controlled and standardized to uniform etching qualities.

In making half-tone negatives with the commonly used processes, the deep blacks in copies will cause those parts to be perfectly clear and free from screen-formation of any kind in the negative, which condition is undesired, as such blacks would print too heavily and a smudgy tone will appear where there are smooth blacks in the copy. To overcome this a very small stop (about one-third the diameter of the normal stop) is placed in the lens and a white sheet of paper is hung over the entire copy and an exposure of about one-third the basic time (according to the whiteness of paper used) is made after the exposure of the copy if made. This process will cause small dots to appear over the clear parts in the negative without affecting the rest of the exposed parts. These small dots will cause the black parts of copies to be reproduced an even tone of black as they are in the copy. This is commonly called "flashing."

Another important object of the invention is to control the flashing of negatives so as to get the required sized dots in the blacks, and for this purpose the flashing stops which will be the smaller ones of the series will be arranged on a row of hooks fastened to the side of the stop rack in appropriate positions to enable the use of them in conjunction with the indicator, the one nearest the center of the indicator, where the attaching screw is, to be used for a given portion of the basic time (about one-third).

The object of my invention is to control the exposures of half-tone negatives in as accurate and simple a manner possible, and also to be adjustable so as to adapt itself to other conditions than those given above. To enable the adjustment of the stop rack either forward or backward from its original position, it is attached by means of the slide device described above and the thumb screw is used to hold it in any position, thereby allowing larger or smaller stops to be moved under the indicator as desired. In some cases this is necessary, as in the making of very coarse or fine screen negatives, and also for the operator who wishes a larger or smaller series of stops to suit his method of photography.

It is also necessary at times to move the flashing stops to conform to the working stops, therefore the hooks on the side of the stop rack are attached to the slide device on the side of the stop rack allowing the movement forward or backward of the flashing stops independently of the others.

In order to operate under any speed conditions, the indicator is detachable by means of a screw 34 (Figure 3) and several other indicators will be furnished of various basic times.

It is well known in photography that judgment of the photographic values of various copies remains with the operator, and it is the object of this invention to furnish the necessary apparatus based on a normal copy which will enable the operator to use his expert judgment with good effect and with the greatest amount of accuracy possible.

It will be seen that applicant's general construction includes the mounting on the plate-carrying part of the camera of an indicator which is automatically moved backward and forward over the upper edges of the graduated stop members in their assigned positions in the rack as the camera is moved to bring it into focus. The indicia carried by the indicator consists of the representation of relative time values corresponding to those particular stops which are positioned in the rack directly under the indicator when the camera has been brought to its focused position.

In the operation of the device the camera is focused according to the size of the reproduction desired. The operator then decides on the time of exposure necessary to produce the proper results from the copy being reproduced and selects the stop from the rack which is found to be directly beneath the selected time value inscribed on the indicator. He then places the stop member in cooperative relation to the lens and exposes accordingly.

The operator then selects the appropriate flash stop by taking the appropriate stop from the hook directly beneath the central point of the indicator and again exposes the plate for one-third of the basic time with a sheet of white cloth or paper covering the copy being reproduced.

In order to use other stops than the average stops ordinarily used, the operator slides the stop rack forward or backward to produce the desired variations it will be clear.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

I claim:—

1. In combination, a camera-carrier and a camera having a stationary lens portion and a movable plate-carrying portion removable and interchangeable, means cooperative with the lens for varying the exposure opening thereof, an indicator carried by the plate-carrying portion, indicia carried by the camera-carrier co-operative with said indicator, and indicia carried by the means for varying the exposure opening, corresponding with the indicia on the camera carrier.

2. In combination, a camera-carrier, and a camera having a stationary lens portion and a movable plate-carrying portion, a series of graduated stops supported on the carrier, and an indicator on plate-carrier adapted to point out different ones of said stops as the plate-carrier is moved.

3. In combination, a camera-carrier and a camera, having a stationary lens portion and a movable plate-carrying portion removable and interchangeable, means cooperative with the lens for varying the exposure opening thereof, an indicator carried by the plate-carrying portion, indicia carried by the camera-carrier cooperative with said indicator, and indicia carried by the means for varying the exposure opening, corresponding with the indicia on the camera carrier, and a timing scale associated with said indicator.

4. In combnation, a camera-carrier, and a camera having a stationary lens portion and a movable plate-carrying portion, a series of graduated stops supported on the carrier, and an indicator on plate-carrier adapted to point out different ones of said stops as the plate-carrier is moved, and a timing scale associated with said indicator.

5. In combination, a camera-carrier, and a camera having a stationary lens portion and a movable plate-carrying portion, a plurality of series of graduated stops supported on the carrier, and an indicator on plate-carrier adapted to point out different ones of said stops as the plate-carrier is moved.

6. A device as set forth in claim 4, in which there is a slidably mounted support having spaced hooks thereon, for the purpose set forth.

In testimony whereof I affix my signature.

WILLIAM C. BUTEHORN.